United States Patent
Lin et al.

(10) Patent No.: US 6,829,021 B2
(45) Date of Patent: Dec. 7, 2004

(54) THIN FILM TRANSISTOR CRYSTAL LIQUID DISPLAY DEVICE INCLUDING PLURAL CONDUCTIVE BEADS AND MANUFACTURING METHOD THEREOF

(75) Inventors: Wen-Jian Lin, Hsinchu (TW); Hsiung-Kuang Tsai, Hsinchu (TW); Shou-Chuan Ho, Hsinchu (TW)

(73) Assignee: Prime View International Co., Ltd., Hsinchu (TW)

( * ) Notice: Subject to any disclaimer, the term of this patent is extended or adjusted under 35 U.S.C. 154(b) by 0 days.

(21) Appl. No.: 10/228,981

(22) Filed: Aug. 27, 2002

(65) Prior Publication Data

US 2003/0058378 A1 Mar. 27, 2003

(30) Foreign Application Priority Data

Sep. 27, 2001 (TW) ........................................ 90123987 A

(51) Int. Cl.⁷ .................... G02F 1/136; G02F 1/1333; G02F 1/1335
(52) U.S. Cl. ........................ 349/43; 113/114; 113/112
(58) Field of Search ........................ 349/43, 112, 113, 349/114, 42, 155

(56) References Cited

U.S. PATENT DOCUMENTS

| | | | | |
|---|---|---|---|---|
| 4,818,077 A | * | 4/1989 | Ohwada et al. ................ 349/34 |
| 5,327,272 A | * | 7/1994 | Fujiwara et al. ............. 349/173 |
| 5,552,914 A | * | 9/1996 | Shinjo et al. ................ 349/139 |
| 5,644,372 A | * | 7/1997 | Shinjo et al. ................ 349/139 |
| 5,784,134 A | * | 7/1998 | Fujimori et al. ............... 349/84 |
| 5,818,560 A | * | 10/1998 | Kouno et al. ................ 349/129 |
| 5,835,248 A | * | 11/1998 | Hanyu et al. ................ 349/124 |
| 5,851,423 A | * | 12/1998 | Teng et al. ................. 252/299.1 |
| 6,037,608 A | * | 3/2000 | Kodaira et al. ................ 257/59 |
| 6,323,924 B1 | * | 11/2001 | Matsuoka et al. ........... 349/122 |
| 6,365,915 B1 | * | 4/2002 | Hirai et al. .................... 257/59 |
| 6,407,783 B1 | * | 6/2002 | Ohgawara et al. ........... 349/110 |
| 6,411,359 B1 | * | 6/2002 | Kobayashi et al. .......... 349/149 |
| 6,456,344 B1 | * | 9/2002 | Nemoto et al. ................. 349/64 |
| 6,556,515 B1 | * | 4/2003 | Sekiguchi .................... 368/242 |
| 2002/0030785 A1 | * | 3/2002 | Enomoto et al. ........... 349/156 |
| 2003/0058395 A1 | * | 3/2003 | Hagiwara .................... 349/139 |
| 2003/0174272 A1 | * | 9/2003 | Shirato et al. .............. 349/149 |
| 2003/0193640 A1 | * | 10/2003 | Park et al. ................... 349/155 |

FOREIGN PATENT DOCUMENTS

JP         03042629 A   *  2/1991   ......... G02F/01/136

* cited by examiner

Primary Examiner—Karl D. Frech
Assistant Examiner—Daniel Walsh
(74) Attorney, Agent, or Firm—Volpe and Koenig, P.C.

(57) ABSTRACT

A structure of a thin film transistor (TFT) liquid crystal display (LCD) device including plural conductive beads and a manufacturing method thereof are provided. The manufacturing method includes the steps of (a) providing an insulated substrate, (b) forming a TFT structure and a transparent electrode structure on the insulated substrate wherein the transparent electrode structure is connected to a source/drain region of the TFT structure, and (c) forming a thin film structure including plural conductive beads on the transparent electrode structure.

24 Claims, 3 Drawing Sheets

THIN FILM TRANSISTOR CRYSTAL LIQUID DISPLAY DEVICE INCLUDING PLURAL CONDUCTIVE BEADS AND MANUFACTURING METHOD THEREOF

FIELD OF THE INVENTION

This invention relates to a thin film transistor crystal liquid display device including plural conductive beads, and more particularly to a reflective type or translucent type thin film transistor crystal liquid display device.

BACKGROUND OF THE INVENTION

Because of the progress of the manufacturing technology, the liquid crystal display (LCD) becomes an extensively used display component. The display theory of LCD is to use an electric field to control the arrangement of crystal molecules and decide the bright or dark effect of the monitor according to whether the crystal molecules can pass through or not. Thus, for LCD, how to obtain the brighter display is still an important research subject until now.

For the reflective type or transparent type thin film transistor crystal display (TFT-LCD), the brightness is decided by the incident and reflective light of the illuminant. Therefore, for obtaining a brighter display, it is necessary to increase the light scattering intensity in the direction perpendicular to the display screen. To reach the purpose described above, it is needed to make a reflector having an optimum reflective characteristic. Thus, a resin layer 114 including a plural transparent resin beads 113 is formed on a first transparent electrode plate 111 (as shown in FIG. 1A), so that when a light passes through a color filter 112 and the first transparent electrode plate 111 to enter the resin layer 114, the light will be offset owing to the impact with the plural transparent resin beads 113. Then, through the electric field effect between the second transparent electrode plate 116 and the first transparent electrode plate 111 formed on the array plate 115 of TFT, the crystal molecules will produce the light scattering, and the scattered light will be reflected by the reflector 117. The advantage of the method described above is about increasing the light scattering angle to control the reflection direction indirectly. However, the disadvantage of this method is that it is difficult to exactly control the scattering direction through adjusting the positions of the plural transparent beads 113.

Because of the shortcomings described above, a manufacturing process of growing a resin layer 124 directly onto the second transparent electrode plate 126 on the array plate 125 of TFT is proposed (as shown in FIG. 1B). Thus, when a light passes through the color filter 122, the crystal molecules will produce the light scattering via the electric field effect between the second transparent electrode plate 126 and the first transparent electrode plate 121, and the resin layer 124 will reflect the scattering light later. Because the structure of the resin layer 124 is crooked, the uneven surface can be used to control the angle of reflection. Consequently, the reflection direction can be controlled effectively.

Although prior arts disclose forming a resin layer to increase the light scattering intensity in the direction perpendicular to the display screen, the manufacturing cost raises relatively and the manufacturing technology becomes more complicate (since a photo-masking is added), too. Thus, the main emphasis of the present invention is how to economize the cost and simplify the manufacturing technology, but still can reach the purpose described above.

Because of the technical defects described above, the applicant keeps on carving unflaggingly to develop "the structure of a thin film transistor crystal liquid display device with a convex structure and the manufacturing method thereof" through wholehearted experience and research.

SUMMARY OF THE INVENTION

It is an object of the present invention to provide a structure of a TFT-LCD including plural conductive beads and the manufacturing method thereof to dispense with the expensive material cost and complicated manufacturing technology in the prior arts.

It is another object of the present invention to provide a method for manufacturing TFT-LCD including plural conductive beads to simplify the manufacturing steps and economize the cost.

It is another further object of the present invention to provide a structure of a TFT-LCD including plural conductive beads that has the same usage of the prior arts but the manufacturing steps of the structure are less than those of prior arts.

In accordance with an aspect of the present invention, the present invention provides a method for manufacturing a TFT-LCD (Thin Film Transistor Liquid Crystal Display) device including plural conductive beads includes steps of (a) providing an insulated substrate, (b) forming a TFT structure and a transparent electrode structure on the insulated substrate wherein the transparent electrode structure is connected to a source/drain region of the TFT structure, and (c) forming a thin film structure including plural conductive beads on the transparent electrode structure.

Preferably, the TFT-LCD is one of a reflective type TFT-LCD and a translucent type TFT-LCD.

Preferably, plural conductive beads are made of a metallic material.

Preferably, each of plural conductive beads has a diameter ranged from 2 to 20 µm.

Preferably, the thin film structure including plural conductive beads is made of a light sensitive resin material.

Preferably, the thin film structure including plural conductive beads has a thickness ranged from 1 to 5 µm.

In accordance with another aspect of the present invention, a TFT-LCD (Thin Film Transistor Liquid Crystal Display) structure including plural conductive beads includes an insulated substrate, a TFT structure formed on the insulated substrate and having a source/drain region, a transparent electrode structure connected to the source/drain region of the TFT structure and formed on the insulated substrate, and a thin film structure including plural conductive beads formed on the transparent electrode structure.

Preferably, the TFT-LCD is one of a reflective type TFT-LCD and a translucent type TFT-LCD.

Preferably, plural conductive beads are made of a metallic material.

Preferably, each of plural conductive beads has a diameter ranged from 2 to 20 µm.

Preferably, the thin film structure including plural conductive beads is made of a light sensitive resin material.

Preferably, the thin film structure including plural conductive beads has a thickness ranged from 1 to 5 µm.

In accordance with additional aspect of the present invention, a method for manufacturing a TFT-LCD (Thin Film Transistor Liquid Crystal Display) device including plural conductive beads includes steps of (a) providing an insulated substrate, (b) forming a TFT structure and a transparent electrode structure above a first surface of the insulated substrate, wherein the transparent electrode structure is connected to a source/drain region of the TFT structure, and (c) forming a thin film layer including plural conductive beads under a second surface of the insulated substrate.

Preferably, the TFT-LCD is one of a reflective type TFT-LCD and a translucent type TFT-LCD.

Preferably, plural conductive beads are made of a metallic material.

Preferably, each of plural conductive beads has a diameter ranged from 2 to 20 μm.

Preferably, the thin film including plural conductive beads is made of a light sensitive resin material.

Preferably, the thin film including plural conductive beads is made of a sticky rubber film.

Preferably, the thin film including plural conductive beads has a thickness not smaller than a diameter of each of plural conductive beads.

In accordance with the other aspect of the present invention, a TFT-LCD (Thin Film Transistor Liquid Crystal Display) structure including plural conductive opaque beads includes a thin film layer including plural conductive opaque beads, an insulated substrate formed on the thin film including plural conductive opaque beads, a TFT structure formed on a first surface of the insulated substrate and having a source/drain region, and a transparent electrode structure formed on the first surface of the insulated substrate, and connected to the source/drain region.

Preferably, the TFT-LCD is one of a reflective type TFT-LCD and a translucent type TFT-LCD.

Preferably, plural conductive opaque beads are made of a metallic material.

Preferably, each of plural conductive opaque beads has a diameter ranged from 2 to 20 μm.

Preferably, the thin film structure including plural conductive opaque beads is made of a light sensitive resin material.

Preferably, the thin film including plural conductive opaque beads is made of a sticky rubber film.

Preferably, the thin film including plural conductive opaque beads has a thickness not smaller than a diameter of each of plural conductive beads.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

Figure 1A:
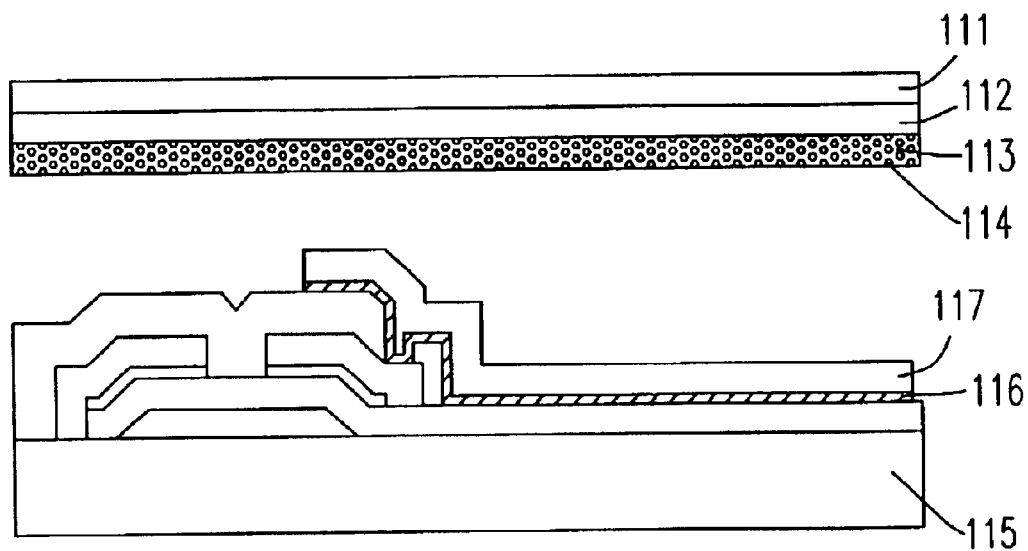
FIGS. 1A~1B are schematic views showing the TFT-LCD with a resin layer formed on the transparent electrode plate in the prior art.
Figure 1B:
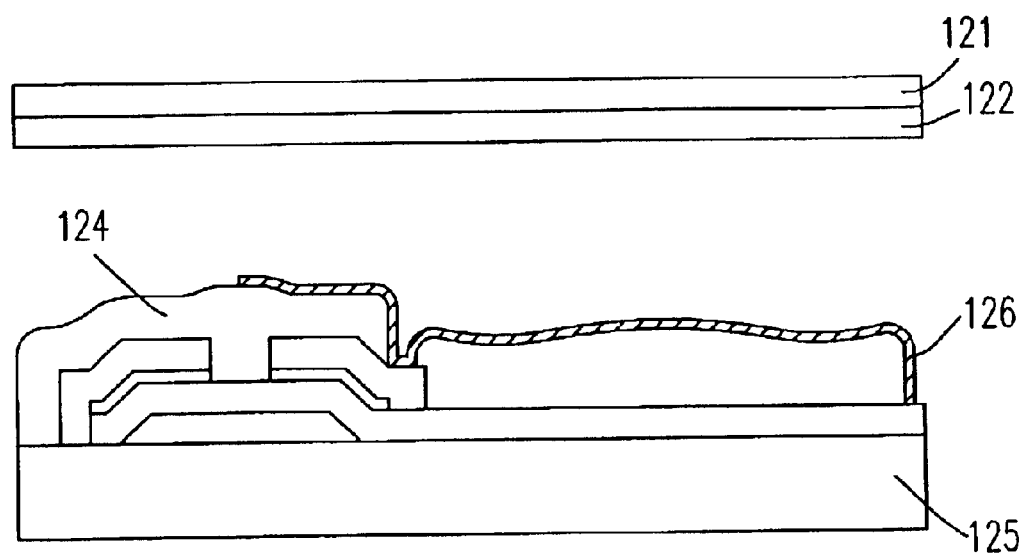
Figure 2A:
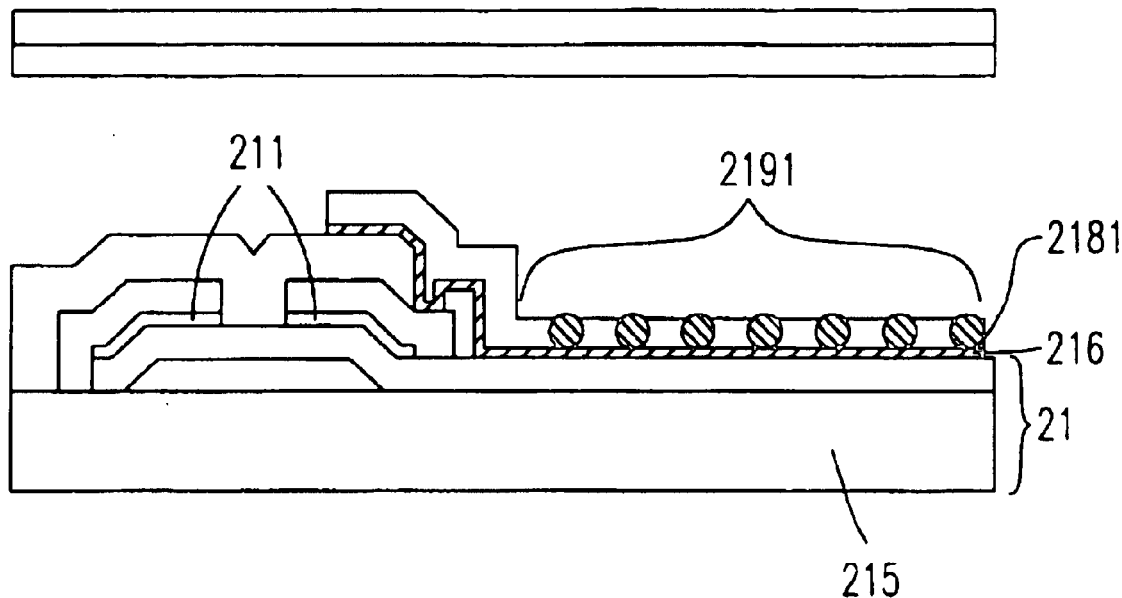
FIGS. 2A~2B are schematic views showing the structure of the TFT-LCD according to a preferred embodiment in the present invention.
Figure 2B:
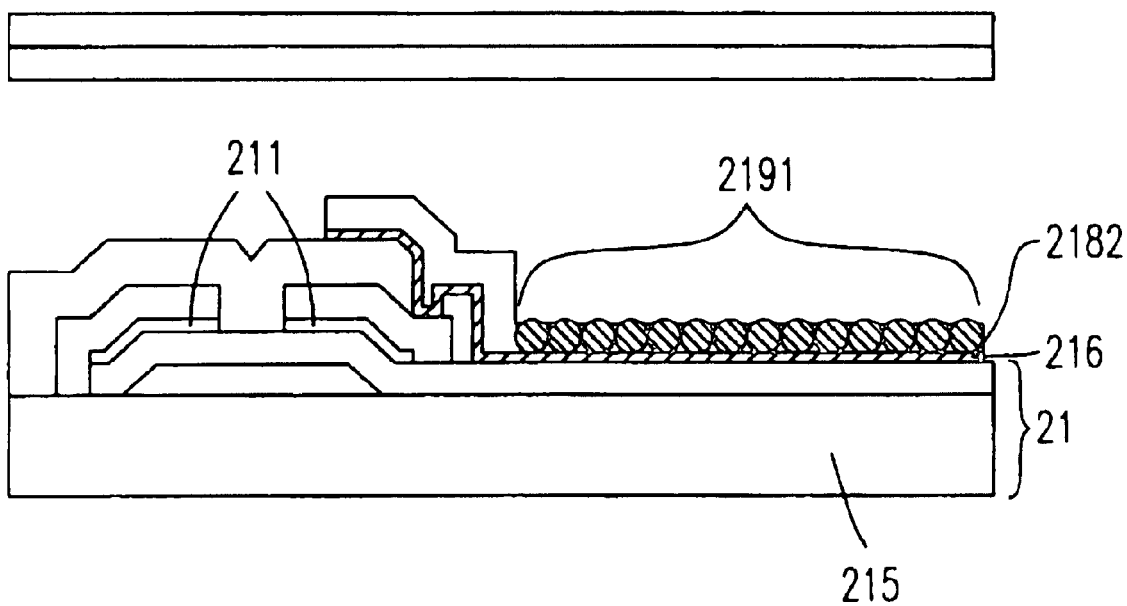

Please refer to FIGS. 2A~2B. FIGS. 2A~2B schematically show the manufacturing methods and steps of the TFT-LCD according to a preferred embodiment in the present invention for improving the conventional methods. According to this preferred embodiment, a transparent electrode structure 216 is grown on a TFT (Thin Film Transistor) structure 21 and connected to a source/drain region 211 of the TFT structure 21, and the thin film structures 2181 and 2182 including plural conductive beads are formed on the transparent electrode structure 216.

The thin film structures 2181 and 2182 are made of a light sensitive resin. Firstly, the light sensitive resin is spread around the transparent electrode structure with a thickness ranged from 1 to 5 μm. Then, the light sensitive resin is filled with plural conductive beads 2191, and plural conductive beads 2191 are fixed in the light sensitive resin by a thermal press. Each of plural conductive beads has a diameter ranged from 2 to 20 um. Moreover, both the dimension of plural conductive beads and the distance between two thereof can be randomly changed according to the formed convexes of the thin film structure 2181 and 2182. But the gradient angles of the formed convexes are better to range from 3 to 20 degrees. As shown in FIG. 2A, when some distances are existed between each two of plural conductive beads, a translucent TFT-LCD will be formed at this time. On the contrary, as shown in FIG. 2B, when the plural conductive beads are arranged close together, a reflective type TFT-LCD will be formed under this situation.

Figure 2C:
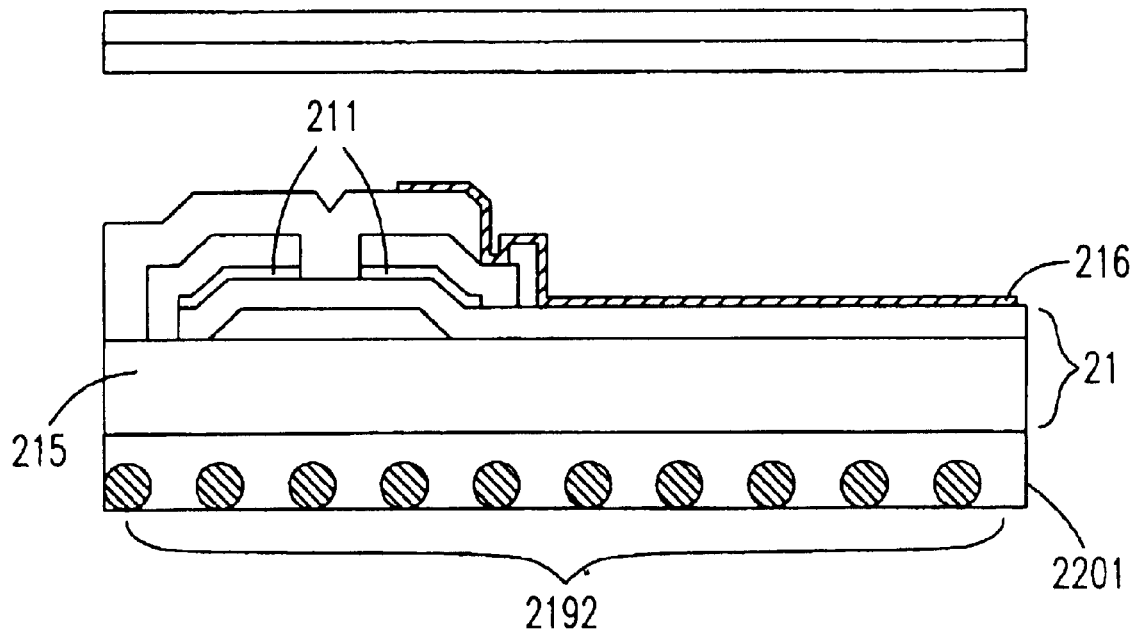
FIGS. 2C~2D are schematic views showing the structure of the TFT-LCD according to another preferred embodiment in the present invention
Figure 2D:
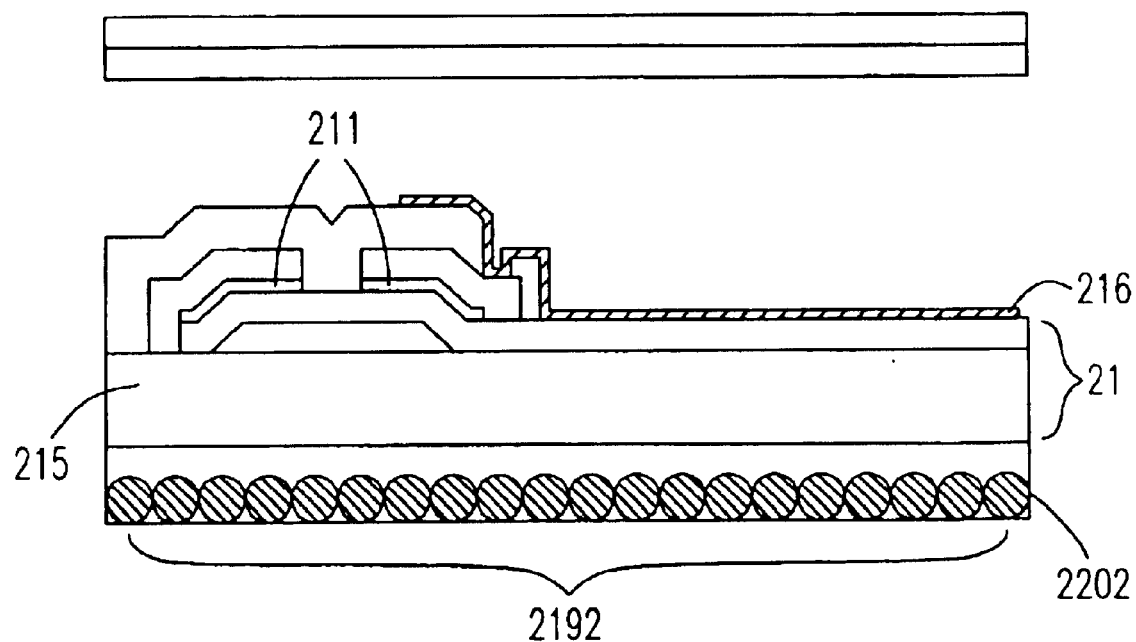

Please refer to FIGS. 2C~2D. FIGS. 2C~2D schematically show the structure of another preferred embodiment according to the present invention. The arrangements of the conductive beads in the preferred embodiment are different from those of FIGS. 2A~2B. In the preferred embodiment, plural conductive beads 2192 are firstly filled in a thin film layer which is made of a resin. And plural conductive beads 2192 must be completely covered by the thin film layer. Then plural conductive beads 2192 can be fixed in the thin films 2201 and 2202 by a thermal press to form the thin films including plural conductive beads. Furthermore, the thin films 2201 and 2202 including plural conductive beads are sticky rubber films which can be designed as different kinds of films with different sizes. Thus, the sticky rubber film which conforms to the needed size can directly and easily be pasted under the array substrate 215 of the thin film transistor structure 21. Each of plural conductive beads 2191 has a diameter ranged from 2 to 20 um. Moreover, both the dimension of plural conductive beads and the distance between two thereof can be randomly changed according to the formed convexes of the thin film layer. But the gradient angles of the formed convexes are better to range from 3 to 20 degrees. As shown in FIG. 2C, when some distances are existed between each two of plural conductive beads 2192, a translucent TFT-LCD will be formed at this time. On the contrary, as shown in FIG. 2D, when the plural conductive beads 2192 are arranged close together, a reflective type TFT-LCD will be formed under this situation.

As described above, compared to the prior arts in the TFT-LCD field, the present invention utilizes the convex structure of the thin film caused by filling plural conductive beads to control the reflective angle and thus effectively control the light reflection direction. Specially, the manufacturing method in the present invention can save one photo-masking process and dispense with the expensive resin, so that the cost can be further minimized. Furthermore, the usage of the sticky rubber film increases the convenience and selectivity in the manufacturing process. Consequently, the present invention conforms to the demand of the industry and owns inventiveness.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for manufacturing a TFT-LCD (Thin Film Transistor Liquid Crystal Display) device including plural conductive beads, comprising steps of:
    (a) providing an insulated substrate;
    (b) forming a TFT structure and a transparent electrode structure on said insulated substrate, wherein said transparent electrode structure is connected to a source/drain region of said TFT structure; and
    (c) forming a thin film structure including said plural conductive beads, creating a diffusion effect on incident light, on said transparent electrode structure, wherein each of said plural conductive beads has a diameter ranged from 2 to 20 $\mu$m.

2. A method according to claim 1 wherein said TFT-LCD is one of a reflective type TFT-LCD and a translucent type TFT-LCD.

3. A method according to claim 1 wherein said plural conductive beads are made of a metallic material.

4. A method according to claim 1 wherein said thin film structure including said plural conductive beads is made of a light sensitive resin material.

5. A method according to claim 1 wherein said thin film structure including said plural conductive beads has a thickness ranged from 1 to 5 $\mu$m.

6. A TFT-LCD (Thin Film Transistor Liquid Crystal Display) structure including plural conductive beads, comprising:
    an insulated substrate;
    a TFT structure formed on said insulated substrate and having a source/drain region;
    a transparent electrode structure connected to said source/drain region of said TFT structure and formed on said insulated substrate; and
    a thin film structure including said plural conductive beads, creating a diffusion effect on incident light, formed on said transparent electrode structure, wherein each of said plural conductive beads has a diameter ranged from 2 to 20 $\mu$m.

7. A structure according to claim 6 wherein said TFT-LCD is one of a reflective type TFT-LCD and a translucent type TFT-LCD.

8. A structure according to claim 6 wherein said plural conductive beads are made of a metallic material.

9. A structure according to claim 6 wherein said thin film structure including said plural conductive beads is made of a light sensitive resin material.

10. A structure according to claim 6 wherein said thin film structure including said plural conductive beads has a thickness ranged from 1 to 5 $\mu$m.

11. A method for manufacturing a TFT-LCD (Thin Film Transistor Liquid Crystal Display) device including plural conductive beads, comprising steps of:
    (a) providing an insulated substrate;
    (b) forming a TFT structure and a transparent electrode structure above a first surface of said insulated substrate, wherein said transparent electrode structure is connected to a source/drain region of said TFT structure; and
    (c) forming a thin film layer including said plural conductive beads, forming the reflective portion of a partially reflective layer, under a second surface of said insulated substrate.

12. A method according to claim 11 wherein said TFT-LCD is one of a reflective type TFT-LCD and a translucent type TFT-LCD.

13. A method according to claim 11 wherein said plural conductive beads are made of a metallic material.

14. A method according to claim 11 wherein each of said plural conductive beads has a diameter ranged from 2 to 20 $\mu$m.

15. A method according to claim 11 wherein said thin film including said plural conductive beads is made of a light sensitive resin material.

16. A method according to claim 11 wherein said thin film including said plural conductive beads is made of a sticky rubber film.

17. A method according to claim 11 wherein said thin film including said plural conductive beads has a thickness not smaller than a diameter of each of said plural conductive beads.

18. A TFT-LCD (Thin Film Transistor Liquid Crystal Display) structure including plural conductive opaque beads, comprising:
    a thin film layer including plural conductive opaque beads;
    an insulated substrate formed on said thin film including said plural conductive opaque beads forming the reflective portion of a reflection layer;
    a TFT structure formed on a first surface of said insulated substrate and having a source/drain region; and
    a transparent electrode structure formed on said first surface of said insulated substrate and connected to said source/drain region.

19. A structure according to claim 18 wherein said TFT-LCD is one of a reflective type TFT-LCD and a translucent type TFT-LCD.

20. A structure according to claim 18 wherein said plural conductive opaque beads are made of a metallic material.

21. A structure according to claim 18 wherein each of said plural conductive opaque beads has a diameter ranged from 2 to 20 $\mu$m.

22. A structure according to claim 18 wherein said thin film structure including said plural conductive opaque beads is made of a light sensitive resin material.

23. A structure according to claim 18 wherein said thin film including said plural conductive opaque beads is made of a sticky rubber film.

24. A structure according to claim 18 wherein said thin film including said plural conductive opaque beads has a thickness not smaller than a diameter of each of said plural conductive beads.

* * * * *